Oct. 25, 1949.  J. C. KOONZ  2,485,745

HEAT DISSIPATOR FOR ELECTRICAL DEVICES AND EQUIPMENT

Filed Aug. 9, 1946  3 Sheets-Sheet 1

Inventor
John C. Koonz
By
Atty

Oct. 25, 1949.  J. C. KOONZ  2,485,745
HEAT DISSIPATOR FOR ELECTRICAL DEVICES AND EQUIPMENT
Filed Aug. 9, 1946  3 Sheets-Sheet 2
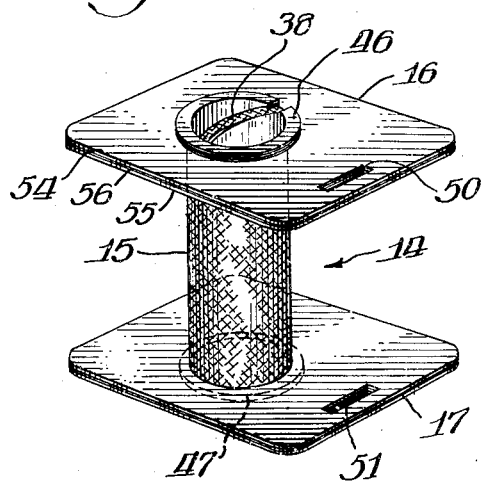
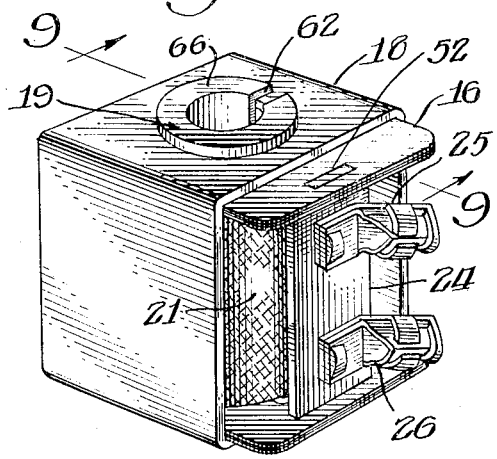
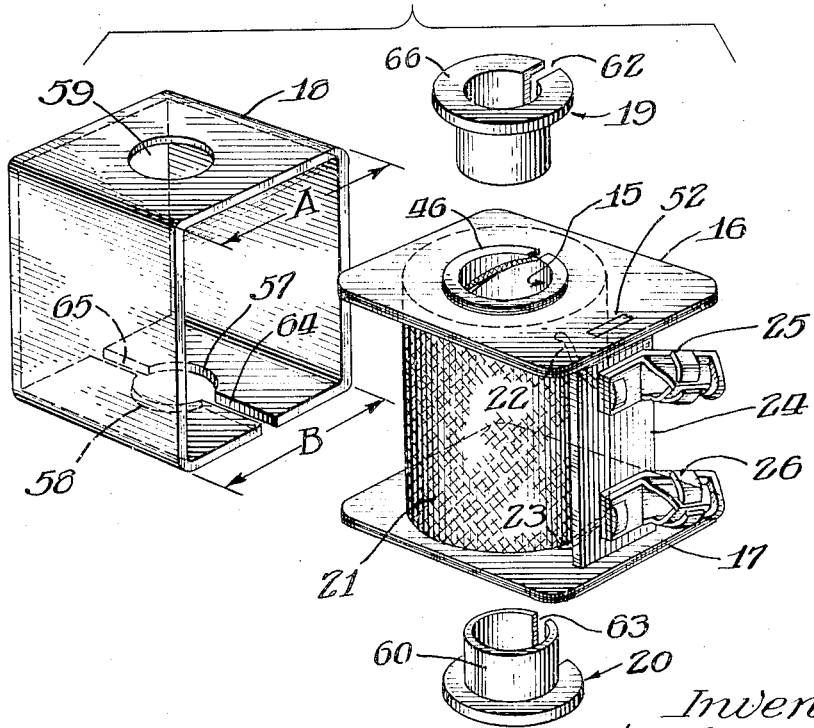
Inventor:
John C. Koonz
By Clarence J. Loftus
Atty Oct. 25, 1949.   J. C. KOONZ   2,485,745
HEAT DISSIPATOR FOR ELECTRICAL DEVICES AND EQUIPMENT
Filed Aug. 9, 1946   3 Sheets-Sheet 3
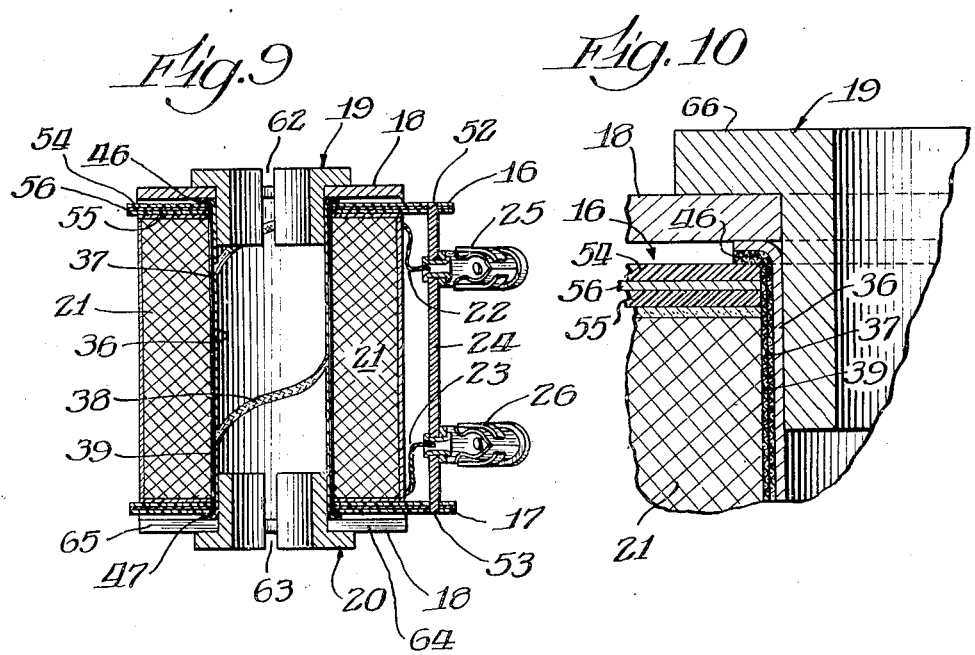
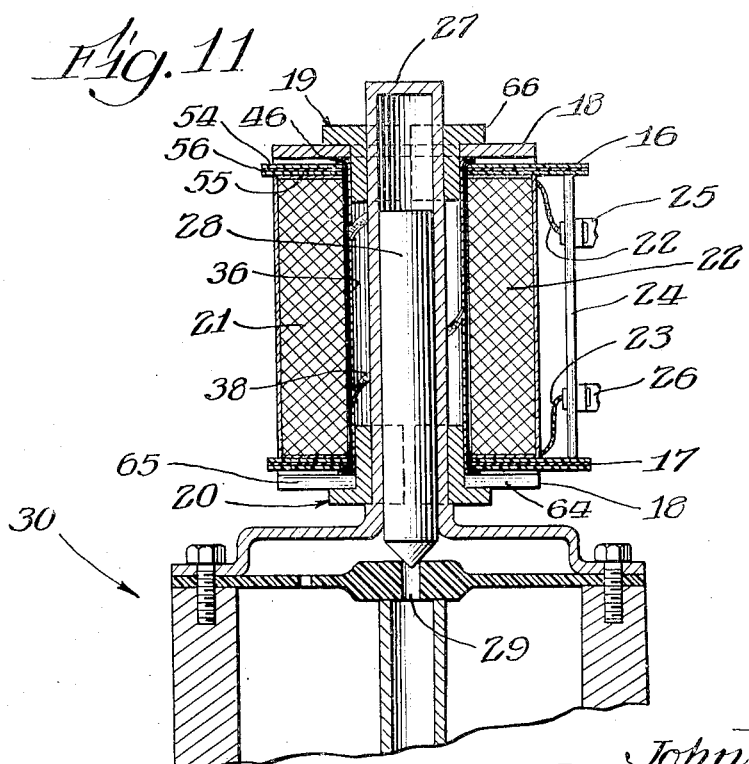
Inventor:
John C. Koonz
By Clarence J. Loftus Atty Patented Oct. 25, 1949

2,485,745

UNITED STATES PATENT OFFICE 2,485,745

HEAT DISSIPATOR FOR ELECTRICAL DEVICES AND EQUIPMENT

John C. Koonz, Fort Wayne, Ind., assignor to The Magnavox Company, Fort Wayne, Ind., a corporation of Delaware Application August 9, 1946, Serial No. 689,460

6 Claims. (Cl. 175—21)

The present invention relates to electrical equipment and devices and specifically to a novel structure for dissipating heat away from such equipment and devices. In one aspect the invention is a novel combined heat dissipator and insulator. In another aspect it is a novel combined heat dissipator and dielectric. Viewed in still another way, it is a novel heat conductor and structural element.

It is elementary that heat is generated in all electrical devices and equipment by reason of the energy or "$I^2R$" losses incidental to their operations. The temperature continues to rise until the rate of heat dissipation becomes equal to the rate of heat generation. The temperature limits on which the rating of a device, switch or the like is based are largely determined by the physical properties of the respective insulating materials. The temperature limits and permissible temperature rises are established by A. I. E. E. and N. E. M. A. Standards and Underwriter's Specifications. These are the predetermined limiting factors upon which the designs of electrical devices and equipment are based.

In general, once the performance characteristics of an electrical device have been specified, the design objective is to produce a device that will do the specified job, within the prescribed temperature limits, and with a minimum amount of copper or other conductive material. Rate of heat generation can be decreased by increasing the gauge of the heat conductors used in the device. But this expedient greatly increases manufacturing costs, particularly under present economic conditions when copper, the almost universal conductor, is scarce and expensive. One of the pressing problems of the day, in the electrical industry, is to reconcile temperature-rise specifications with the scarcity of copper and other commercially used conductive materials. This problem is of long standing, and current marketing conditions have made urgent the finding of a solution.

Its broad object is to provide an effective arrangement for dissipating heat away from electrical devices and equipment, to the end that high rates of heat generation may be tolerated, thereby effecting substantial savings in copper consumption. A solenoid embodying the teachings of this invention has been made with only 33% of the copper required by prior-art solenoids, the operating conditions, performance characteristics, permissible temperature rise and other commercial requirements being the same. A brief reflection on the vast amount of conductive material consumed by the electrical industry in the manufacturing of solenoids, dynamo-electric machinery, switches, converters, transformers, relays, and other electrical equipment and devices having ratings fixed by permissible temperature rises compels a realization of the paramount importance of this object.

It is also an object of the invention to provide a heat dissipator for electrical devices and equipment which is at once effective to perform its main purpose and to serve as a structural element.

Another object of the invention is to provide a heat-dissipating structure which also serves as a dielectric.

A further object of the invention is to provide a novel combination of heat-dissipator and insulator.

It is another object of the invention to provide a heat-dissipating structure for alternating current electro-magnetic equipment or equipment in which direct current transients exist, an arrangement so constructed as to prevent undesired magnetic interlinkages and induction action.

A further object of the invention is to provide a heat-dissipating structure that can be placed in close proximity to hot spots in windings without creating effective short-circuited turns or otherwise impairing their electrical operation.

A specific object of the invention is to provide a novel solenoid construction including a heat-dissipating arrangement of high thermal conductivity that does not interfere with the normal operation of the solenoid.

Another specific object is to provide a bobbin, here shown for purposes of illustration in a solenoid, adapted for use in supporting a winding in an electromagnetic device, a bobbin which reconciles conflicting requirements and possesses in high degree all of the three desirable characteristics of a bobbin: (1) high heat conductivity; (2) high dielectric strength; (3) sufficient mechanical strength for production purposes.

A further object of the invention is to provide a novel solenoid terminal construction, cheaply manufacturable and not adversely affected by vibration.

Still another object of the invention is to provide a novel, durable and economical solenoid housing construction.

The specific problem which prompted the study, reflection, experimentation and research that resulted in the present invention was the production of a solenoid, using a minimum of copper and yet meeting rigid Underwriter's temperature-rise restrictions. Therefore the invention is herein disclosed as embodied in a solenoid. It should be understood, however, that the invention has a wide range of prospective application to electrical devices generally and is not restricted to the exemplary application herein specifically described.

Other objects and capabilities of the invention will be apparent in the following description of the accompanying drawings, in which I disclose an improved solenoid utilizing a preferred embodiment of the invention.

Figure 1:
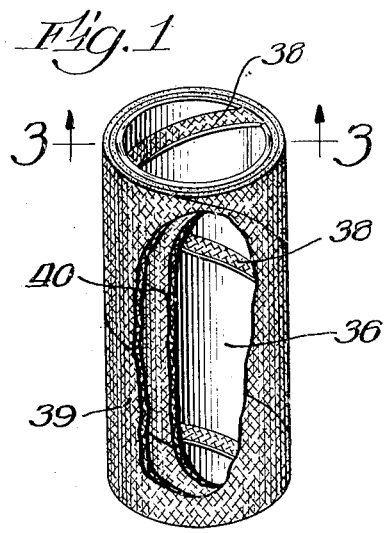
Fig. 1 is a bobbin core constructed in accordance with the invention, and adapted for use in an alternating current solenoid.
Figure 4:
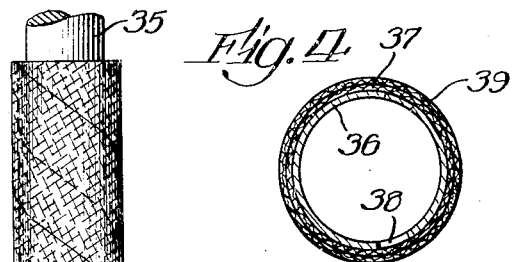
Figure 2:
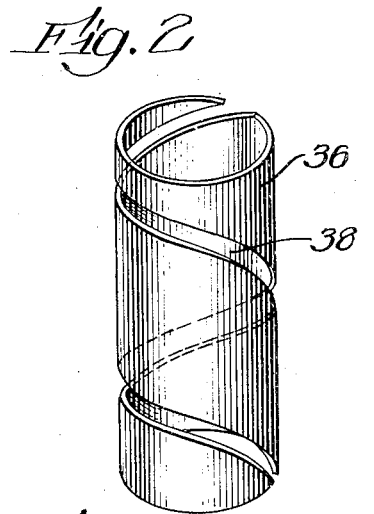
Fig. 2 is a perspective view of the heat-conductor element of the Fig. 1 bobbin core.
Figure 5:
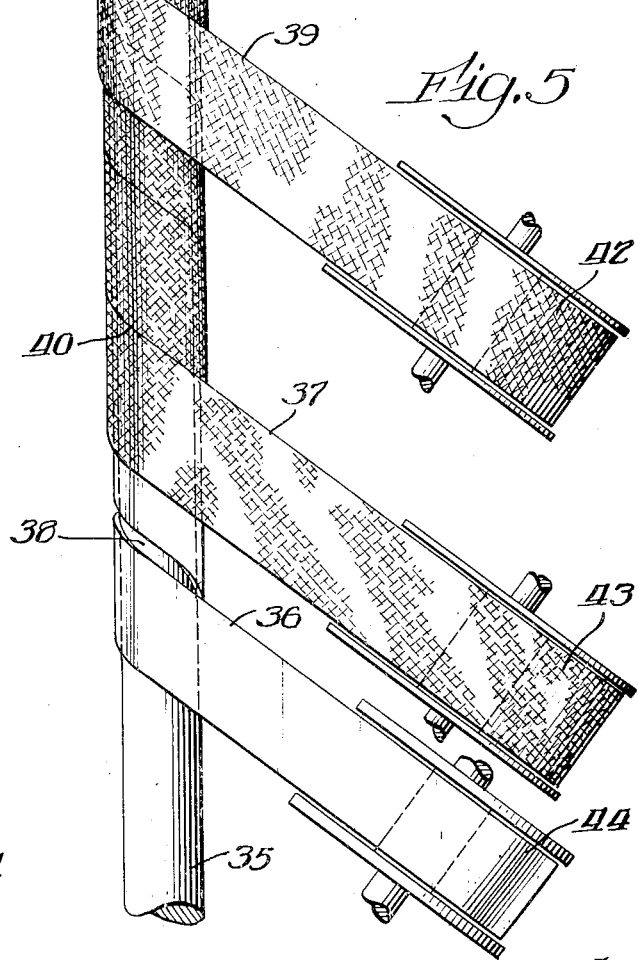
Figure 3:
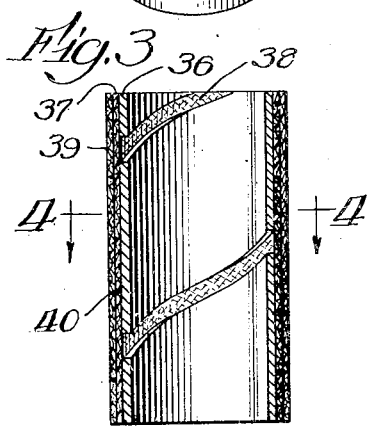

Figs. 3 and 4 are sectional views of the core as taken on lines 3—3 of Fig. 1 and 4—4 of Fig. 3, respectively;

Fig. 5 is a view showing the method of winding the core elements on a mandrel to form the completed core;

Fig. 6 is a perspective view of a complete bobbin constructed in accordance with the invention, showing the laminated end members in place;

Fig. 7 is a perspective view showing the various components of a solenoid (other than the plunger and guide) constructed in accordance with the invention;

Fig. 8 shows the assembled solenoid;

Fig. 9 is an elevational sectional view of the solenoid;

Fig. 10 is an enlarged fragmentary sectional view showing the details of the assembly of bobbin, bushing, winding, housing and laminated end member in the solenoid;

Fig. 11 is an elevational sectional view of the solenoid, including the plunger and guide, as set up for operation of a Dole water control unit, a representative application.

Referring briefly to Figs. 6, 7, and 11 there is illustrated a solenoid comprising the following principal components:

A bobbin 14, having a bobbin core 15 and end members 16 and 17; a housing 18; a pair of bushings 19 and 20; a winding 21 having flexible leads 22 and 23; a terminal strip 24; a pair of terminals 25 and 26; a plunger guide 27 and a plunger 28.

The operation of the solenoid is as follows: A voltage is applied at terminals 25 and 26, causing current to flow in winding 21. The magnetic circuit including bushings 19 and 20, plunger 28 and the air gap between the plunger and the remainder of the magnetic circuit is excited, and plunger 28 is magnetically attracted to a position within the solenoid, opening orifice 29 of water control valve 30. When the winding 21 is deenergized, the plunger 28 drops and closes the orifice.

While the novel solenoid provided in accordance with the invention is herein shown as set up and is of particular utility in controlling a Dole water control unit, valve part number H-3565, generally indicated at 30 (Fig. 11) in an automatic washing machine, it will be understood that this application is so shown for purposes of illustration only and that the solenoid is of general utility. Since the Dole valve is per se no part of the present invention, no further description thereof is deemed necessary or desirable.

The above gross description provides a background for showing how the problem solved by this invention arises and for describing the solution in detail. Let it be assumed that the exciting current is to be taken from substantially constant voltage mains and that a prescribed magnetic pull is to be developed in a given magnetic circuit. Thus the number of ampere-turns required is predetermined. The power used in the windings varies with the square of the applied voltage and inversely with resistance $$\left(\frac{E^2}{R}\right)$$

so that it is desirable, from the standpoint of power consumption, to use fine wire. This is one of several requirements or desired characteristics. However, the temperature rise limitation—generally 65 degrees centigrade for solenoids—is an important limitation or requirement that cannot be exceeded. In general, prior-art constructions do not lend themselves to rapid heat dissipation, the conductor itself being the principal means for heat dissipation. Likewise, prior-art construction resulted in considerable heat-generation internally of the coil, it being generally necessary to dissipate the heat outwardly through the conductor proper. The temperature-rise limitation has heretofore been met by the use of more conductive material and a conductor of larger cross-section. A third requirement, from the standpoint of economy, is that a minimum amount of copper should be used. The second requirement is mandatory and one problem solved by the invention is the reconciliation of the first and third requirements with the second.

The "hot spots" in a solenoid are the surfaces between the interior of the winding and the exterior of the bobbin-core. The invention provides a bobbin structure which rapidly conducts heat away from these high-temperature zones to the outer or ambient temperature zone. The bobbin should possess three characteristics: First, it should have a high thermal conductivity; second, it must have sufficient dielectric strength to withstand the high potential gradients existing between winding and metallic solenoid components at ground potential; third, it must have sufficient mechanical or structural strength for production purposes and for performing its permanent supporting function.

The conventional coil bobbin is made from dielectric material such as "Bakelite" or paper. The heat conductivity of these materials is insufficient. Since dielectric strength varies directly as wall thickness, it is desirable to make the core walls thick. On the other hand, since heat conductivity varies inversely with wall thickness, it is desirable to make the bobbin core walls as thin as possible consistent with the dielectric strength required. But if this expedient is pursued, then a conflict with the third requirement is introduced. To the extent that the wall is made thinner, for any minimum specified dielectric strength, the mechanical strength of the bobbin becomes less. This expedient is not effective in saving substantial amounts of copper or other conductor material. If it were pursued to the extent necessary to effect significant copper economy, then the mechanical rigidity of the bobbin would be insufficient to provide adequate support for the winding during production and operation.

Reference is now specifically made to Figs. 1 through 5 for a detailed showing of the structure provided in accordance with the invention, a structure so effective as to make approximately a 66% saving in conductive material, while reconciling all of the above conflicting requirements. First there is spirally wound on a mandrel 35 a continuous strip of material 36 having high specific thermal conductivity and great structural strength. These are the desired characteristics of this material for general applications.

In this particular alternating current solenoid I provide for two other requirements. First, I employ a nonmagnetic material, preferably aluminum. Copper, brass, silver, or any other metal or alloy classified as non-magnetic and having a high specific thermal conductivity can be substituted for aluminum. Second, I prevent undesired magnetic interlinks between the strip 36 and the winding 21 (when energized) and undesired secondary action by spacing the successive turns of strip 36. The bobbin core for an alternating-current solenoid should not have touching adjacent turns, because a closed turn is effectively a short-circuited turn and represents electrical losses. It will be understood that the two last-mentioned characteristics should preferably but not necessarily be provided for when the invention is embodied in direct current devices, the operation of which might be slightly impaired by the inducing of currents in shorted electrical paths during the existence of direct current transients. This follows from the fact that a varying direct current has alternating current components.

In contact with strip 36 there is wound a strip 37 of a good dielectric or insulating material preferably having as desirable a specific thermal conductivity characteristic as can be found in such materials, such as varnished cambric. This strip is preferably wound with adjacent turns touching and overlying the gaps 38 between the turns of the heat-conductive element 36. Optionally there is wound over strip 37 another continuous strip 39, having the same characteristics as strip 37 and preferably of the same material. This strip 39 is so wound that its turns overlie the points of contact 40 between the turns of strip 37. The strips are continuously wound on mandrel 35, being fed from supply reels 42, 43, and 44. The finished (Fig. 1) bobbin-cores are cut to the desired length for fabrication.

It is essential that at least one heat conductor 36 and some dielectric or insulator means be provided. Several heat conductive strips may be employed, if desired. Two dielectric strips 37 and 39 are shown, but one is sufficient and two or more may be used. Further, the heat conductor 36 per se has general utility.

It should be noted that this bobbin-core has these advantages:
(1) Great rigidity for a small cross-section;
(2) High dielectric strength;
(3) Good heat conductivity between coil and inner surface;
(4) Low production costs.

After the winding 21 is placed on the bobbin core and the end members 16 and 17 are placed in position on the bobbin-core the terminal strip 24 is put in place. The bobbin-core is then flared outwardly at both ends, as indicated at 46 and 47. This construction serves two useful purposes: The flared portions secure the end members 16 and 17 to the bobbin-core portion of the bobbin, and maintain the bobbin in assembly; and the flared portions lead the heat-conductor element 36 out to the ambient low temperature zones and out to the end members, the bushings and the casing or housing.

The end members 16 and 17 are alike. Each is provided with an aperture 50 or 51 (Fig. 6) into which an end 52 or 53 of the terminal strip 24 fits. Although the end members may be constructed of any suitable dielectric, I prefer to apply to them the teachings of this invention. Accordingly, end member 16 comprises two sheets 54 and 55 having the same characteristics as strip 37 and an intermediate sheet 56 having the same characteristics as sheet 36. The aluminum foil 56 dissipates heat in a direction radially outwardly from the axis of the solenoid. In an A. C. application foil 56 should be split to prevent the existence of a shorted electrical path. The bobbin assembly is given a lacquer dip before the casing is slipped on.

The housing 18 is punched out as a one-piece low carbon steel stamping and bent to the desired shape. When it is in place, the dimension A (Fig. 7) is equal to the dimension B and the arcuate surfaces 57 and 58 (each less than one hundred and eighty degrees) define arcs of a circle, embracing shank 60 of bushing 20. When the casing is not in assembled position, edges 64 and 65 are biased into contact by the inherent spring action of the casing. The shank of bushing 19 projects through aperture 59. This inherent spring action insures a firm grip between casing and bobbin when the casing is slipped into place. Thus the flared portions 46 and 47 of the bobbin are firmly pressed against the end members 16 and 17.

Next the bushings 19 and 20 are pressed into place. These are split at 62 and 63 to prevent them from acting as short-circuited electrical paths, for reasons already set forth herein. Flange 66 of bushing 19, casing 18, flare 46, and end member 16 are compressed together in tight assembly (Fig. 10).

Slack is left in leads 22 and 23 and they are soldered to terminals 25 and 26. The flexible leads have the advantage of long wear under conditions of vibration. Then the brass cylindrical plunger guide 27 and ferrous-metal plunger 28 are put into place. That is, the assembly shown in Fig. 8 is slipped on the guide 27, the fit between the guide and the bushings being tight. The inner laquer coating on bobbin-core 15 electrically insulates strip 36 from the metallic members 19, 20 and 27.

In operation the metal foil 36 rapidly conducts heat along the interior of the core, from the hot spots to the hollow interior of the bobbin and out to the ends of the bobbin core 15. Then the end members conduct it away from the solenoid axis, and the bushings and casings carry it out for radiation to the ambient atmosphere. Thus heat is rapidly dissipated into the surrounding atmosphere.

The metal foil 36 not only is an excellent heat conductor but it also has great structural strength, considering its thin gauge. The varnished cambric 37, 39 is a good dielectric and a fair heat conductor. This construction is so effective that copper costs can, as indicated above, be drastically reduced.

This invention has utility in electrical devices generally, wherever the problem of dissipating heat while maintaining adequate insulation arises.

Therefore, while I have shown the invention as embodied in a solenoid, it will be obvious now to those skilled in the art who have the benefit of this full and complete disclosure, that various changes and modifications of the solenoid and applications of my heat dissipating structure may be made without departing from the true scope of the invention. It is accordingly intended in the appended claims to cover all such equivalents as fairly fall within the invention.

Having thus described my invention, I claim:

1. In an electrical device the combination of a hollow, spirally wound core of metallic sheet material having high specific thermal conductivity, an insulating layer mounted on the spirally wound core and a current carrying winding mounted on the insulating layer; together with layered end plates including at least one metallic layer having high specific thermal conductivity and split metallic sleeves having high specific thermal conductivity extending through apertures in the end plates and telescoped within the spirally wound core of metallic sheet material to provide a mainly metallic path from the spirally wound core to the end plates, whereby heat generated in the core is dissipated from the sleeve and end plates.

2. The combination in accordance with claim 1 and in which said core material is nonmagnetic.

3. The combination in accordance with claim 1 and in which said core material is aluminum foil.

4. The combination in accordance with claim 1 and adapted for use with a winding excited by alternating or transient currents, wherein said core is wound with spaced turns to prevent said core from acting as a secondary.

5. The combination in accordance with claim 1 and in which the insulating layer comprises a strip of dielectric material in contact with said conductive strip and placed between said core and said winding.

6. The combination in accordance with claim 1 and in which the insulating layer comprises a strip of varnished cambric spirally wound around the outside of said metallic core.

JOHN C. KOONZ.

REFERENCES CITED

The following references are of record in the file of this patent:

UNITED STATES PATENTS

| Number | Name | Date |
| --- | --- | --- |
| 480,681 | Wheeler | Aug. 9, 1892 |
| 659,710 | Stevens | Oct. 16, 1900 |
| 1,320,980 | Bowman | Nov. 4, 1919 |
| 1,362,138 | Pratt | Dec. 14, 1920 |
| 1,460,390 | O'Leary | July 3, 1923 |
| 1,603,939 | Dubilier | Oct. 19, 1926 |
| 1,608,891 | Lee | Nov. 30, 1926 |
| 1,745,878 | Trumpler | Feb. 4, 1930 |
| 1,837,245 | Wheeler | Dec. 22, 1931 |
| 1,840,139 | Turner | Jan. 5, 1932 |
| 2,351,379 | Wehringer | June 13, 1944 |
| 2,368,025 | Jamison | Jan. 23, 1945 |
| 2,396,363 | DuBois et al. | Mar. 12, 1946 |